(12) United States Patent
Wilson

(10) Patent No.: US 7,407,352 B2
(45) Date of Patent: Aug. 5, 2008

(54) METHOD AND APPARATUS FOR REMOVING CARTS FROM A TRAILER

(75) Inventor: Charles Ellsworth Wilson, North Canton, OH (US)

(73) Assignee: Waltco Truck Equipment Company, Tallmadge, OH (US)

( * ) Notice: Subject to any disclaimer, the term of this patent is extended or adjusted under 35 U.S.C. 154(b) by 355 days.

(21) Appl. No.: 11/199,340

(22) Filed: Aug. 8, 2005

(65) Prior Publication Data

US 2007/0031228 A1 Feb. 8, 2007

(51) Int. Cl.
*B60P 1/44* (2006.01)

(52) U.S. Cl. .............................. 410/19; 410/30; 410/66; 410/94; 414/545

(58) Field of Classification Search .................. 410/19, 410/30, 66, 94, 121; 188/32
See application file for complete search history.

(56) References Cited

U.S. PATENT DOCUMENTS

| | | | |
|---|---|---|---|
| 2,623,759 A * | 12/1952 | Forbas | 410/30 |
| 3,077,247 A * | 2/1963 | West et al. | 188/111 |
| 3,233,767 A * | 2/1966 | Goodacre | 414/495 |
| 3,570,411 A * | 3/1971 | Adler et al. | 410/67 |
| 3,870,126 A * | 3/1975 | Himes | 187/403 |
| 4,087,007 A * | 5/1978 | Drews | 414/545 |
| 5,184,366 A * | 2/1993 | Rawdon et al. | 14/71.5 |
| 5,249,532 A * | 10/1993 | Perrot | 105/355 |
| 5,683,221 A * | 11/1997 | Ablabutyan | 414/540 |

* cited by examiner

*Primary Examiner*—James Keenan
(74) *Attorney, Agent, or Firm*—Emerson, Thomson, & Bennett; Robert D. Emerson; Timothy D. Bennett

(57) ABSTRACT

A new and improved shopping cart release system is disclosed for use in collecting, transporting, removing and loading various types of carts and carriers. A release system is adapted for use with carts of the type configured for materials handling and a vehicle such as a semi-truck trailer used to transport such carts. The release system includes and a ramp that physically engages with a cart so as to retain the cart within the semi-trailer. An automated remote system may also be used, enabling an operator to release a cart without having to manipulate the release system directly. The release system is located within the floor of the semi-trailer. The release system can also be used in other arrangement, for example, within a liftgate mechanism that has the release system incorporated within the loading ramp of the liftgate. The release system utilized in the liftgate operates in the same manner as that of the release system incorporated within the floor of the bed of a semi-trailer truck.

16 Claims, 5 Drawing Sheets

METHOD AND APPARATUS FOR REMOVING CARTS FROM A TRAILER

I. BACKGROUND OF THE INVENTION

A. Field of the Invention

This invention relates generally to materials handling and, in particular, to carts that may be decoupled from within a larger trailer/transport carrier through a release system.

B. Description of the Related Art

Typically, carts, goods carriers, or the like are used to facilitate the shopping process by allowing a shopper to move throughout a grocery or department store and successively place selected goods in the cart for purchase. Also, carts are used to convey the purchased goods or items to the shopper's vehicle; automobile, car, truck, or the like.

Carts are loaded onto larger transport carriers, such as semi-trailers, and problems often arise both in terms of cart transport and removal from the trailer. As for transport, unless the carts are somehow physically secured to one another and/or to the trailer, the carts may become unacceptably unstable, particularly during a rough ride. Often, the carts themselves are utilized to transport goods from one location to another. The carts are loaded from a first location with goods that, for example, a grocery store places upon a shelf to sell to an end user. The carts, along with the goods contained therein, are removed from the carrier where the goods are placed within the store for selling. The utilization of carts in this manner expedites shipping and provides a convenient and cost-effective manner to ship goods.

Tethering the carts to each other and/or to the trailer tends to create consequential problems during cart removal. The operator of the vehicle or other device used to pull the carts out of the trailer must somehow unlatch them, which might require the operator to maneuver around the carts in the trailer and unfasten chains or other fastening items. Undoubtedly, any arrangement capable of simplifying or automating the process of loading and de-coupling carts of this kind from a larger carrier or vehicle would be appreciated by those engaged in such activities.

Unloading carts of this kind from a large trailer can be quite tedious. Oftentimes, carts roll off of the trailer since there is nothing to impede their progress. For example, where a carrier is on an incline, the carts are forced against the rear of the carrier. Other times, as explained in the preceding paragraph, they are coupled together via some securing means. In either event, there is a need to impede the releasing of carts from a carrier.

II. SUMMARY OF THE INVENTION

Other objects and further scope of the applicability of the present invention will become apparent from the detailed description to follow, taken in conjunction with the accompanying drawings wherein like parts are designated by like reference numerals.

Disclosed is a release system for use with wheeled carts of the type configured for materials handling and having at least one front wheel and at least one rear wheel and a vehicle having a cart-carrying area with a fore section, an aft section, a front wall and a floor for cart loading and unloading, the system comprising at least one ramp positioned within the floor of the cart-carrying vehicle, the at least one ramp able to impede the travel of the cart along the floor of the cart-carrying vehicle. The at least one ramp can have a central axis about which the at least one ramp is able to rotate about. The at least one ramp accepts at least one wheel of the cart to impede the travel of the cart. The at least one ramp has the ability to stop the cart from the cart's travel over the at least one ramp. The at least one ramp has a central axis about which the at least one ramp rotates about and wherein the cart is able to travel over the at least one ramp.

Also disclosed is a release system for use with wheeled carts of the type configured for materials handling and having at least one front wheel and at least one rear wheel and a vehicle having a cart-carrying area with a fore section, an aft section and a floor for cart loading and unloading, the vehicle further having a floor and a front wall, the system comprising a liftgate having a loading ramp with at least one opening within the loading ramp, at least one ramp positioned within the loading ramp of the liftgate, the at least one ramp able to impede the travel of the cart along the loading ramp of the liftgate. The at least one ramp has a central axis about which the at least one ramp is able to rotate about. The at least one ramp accepts at least one wheel of the cart to impede the travel of the cart. The at least one ramp has the ability to stop the cart from the cart's travel over the at least one ramp. The at least one ramp has a central axis about which the at least one ramp rotates about and wherein the cart is able to travel over the at least one ramp.

Yet further disclosed is an apparatus for removing carts from a trailer bed, the carts having at least one front wheel and at least one rear wheel, the apparatus comprising at least one ramp positioned within the trailer bed, the at least one ramp having a central axis about which the at least one ramp rotates about, the at least one ramp able to accept at least one wheel of the cart, the at least one ramp having the ability to stop the cart from its travel over the at least one ramp, the at least one ramp able to rotate about the central axis to allow the cart to travel over the at least one ramp.

Yet further disclosed is an apparatus to aid the removal of carts from a trailer, the carts having two front wheels and two rear wheels, the apparatus comprising a liftgate having a loading ramp with at least one opening within the loading ramp, at least one rotatable ramp fixedly attached within the opening of the loading ramp and attached to the loading ramp of the liftgate, the at least one rotatable ramp having a central axis about which it rotates, the at least one rotatable ramp having a first, second, third and fourth portion, the second, third portions able to be respectively selectively engaged by one wheel of the cart, the second, third portions forming a 90 degree or less angle with respect to one another, the first portion angled downwardly with respect to the loading ramp forming an upward ramp from the loading ramp to the first portion, the first portion being continuous with the second portion, the second portion extending downwardly into the opening of the loading ramp, the second portion being contiguous with the third portion, the rotatable ramp rotating about where the second and third portions meet.

A method is disclosed for removing carts from a trailer having a liftgate with a loading ramp with at least one opening within the loading ramp installed therein, the liftgate further having at least one ramp located therein, the at least one rotatable ramp having a central axis about which it rotates, the at least one rotatable ramp having a first, second, third and fourth portion, the second, third portions able to be respectively selectively engaged by one wheel of the cart, the second, third portions forming a 90 degree or less angle with respect to one another, the first portion angled downwardly with respect to the loading ramp forming an upward ramp from the loading ramp to the first portion, the first portion being continuous with the second portion, the second portion extending downwardly into the opening of the loading ramp, the second portion being contiguous with the third portion, the rotatable ramp rotating about where the second and third portions meet the carts having two front wheels and two rear wheels, wherein the ramp of the liftgate is in a first position that allows the cart to travel across the ramp without impeding the cart's travel, the method comprising (a) moving the cart from a first position inside the trailer bed to a second position, the second position contacting the loading ramp of the liftgate wherein at least one wheel of the cart engages the ramp located within the loading ramp of the opening of the liftgate; (b) rotating the ramp of the liftgate to a second position; (c) moving the cart to a third position whereby at least one rear wheel contacts the ramp that is in a first position whereby the ramp stops the travel of the cart at this third position; (d) pulling the cart away from the ramp in a direction opposite to the movement in (c); (e) rotating the ramp to the first position; (f) moving the cart to a fourth position wherein the entire cart is beyond the ramp.

III. BRIEF DESCRIPTION OF THE DRAWINGS

IV. DESCRIPTION OF THE PREFERRED EMBODIMENT

Figure 1:
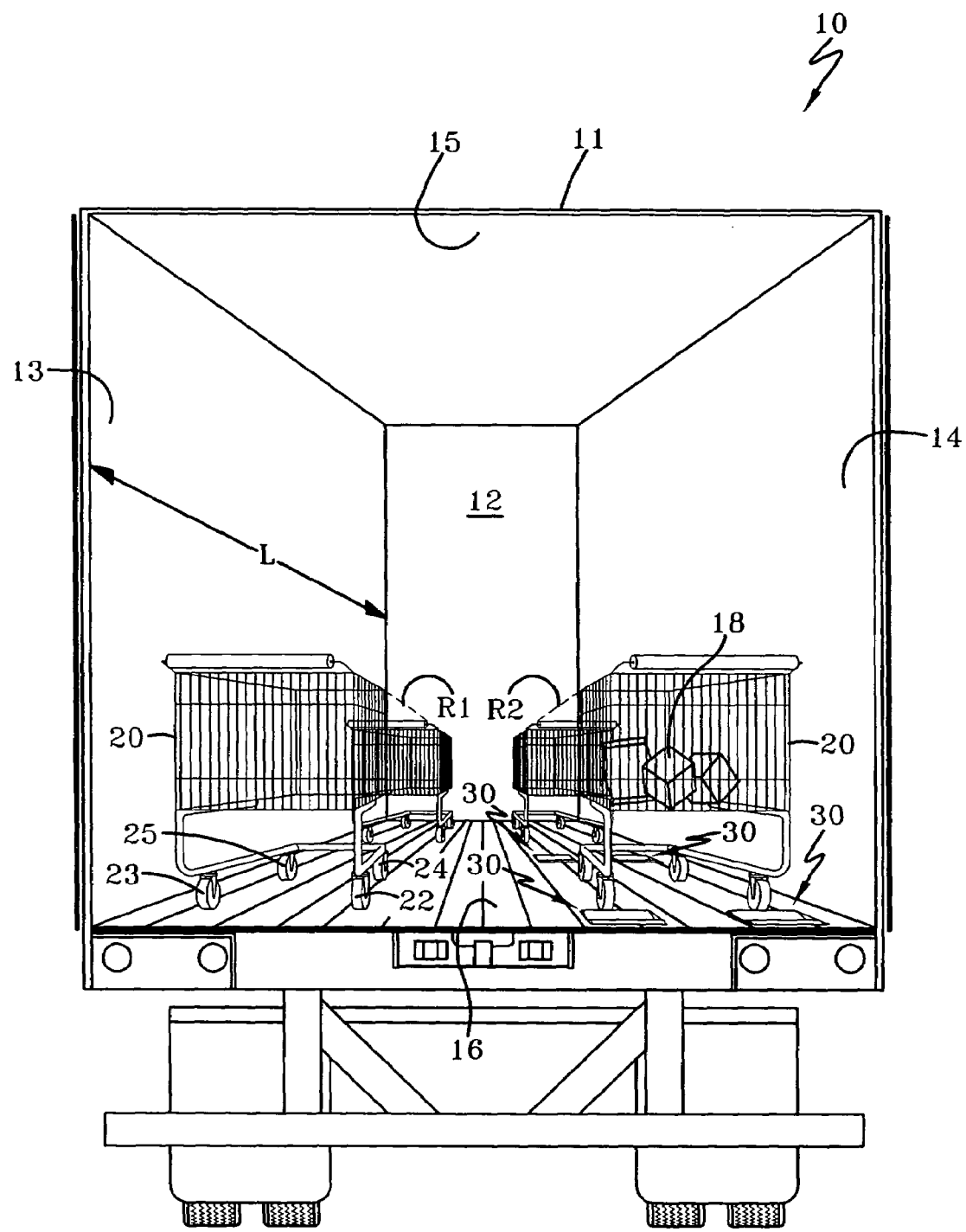
FIG. 1 is a three-dimensional view looking into the rear-loading end of a trailer having two (2) rows of carts loaded therein with the release system installed therein.

This invention specifically pertains to carts that are used in association with the transporting of goods inside a trailer but could also be carts that are used in grocery and convenience stores; however, the invention disclosed herein can be used in association with any type of an object having wheels. Grocery and convenience stores supply shopping carts for the use of their customers in collecting and moving their goods to the purchasing area for purchasing the items and then moving the items to the customer's vehicle. Turning now to the drawings, FIG. 1 is a view into the back or loading end 11 of a semi-trailer 10, as might be seen from a loading dock, with the carts shown loaded therein. The inside of the semi-trailer 10 includes a forward wall 12, two side walls 13, 14, a sealing or top wall 15, and a base or floor 16. Carts 20 are shown within the loading end 11 of the semi-trailer 10. The carts 20 can be loaded with goods 18 or empty as shown. Typically, the semi-trailer 10 is fully loaded with carts 20 that are loaded with goods 18, respectively, to aid in shipping the goods 18 from one location to the other in a cost-effective manner. There are typically at least two rows, $R_1$, $R_2$, of carts 20 within the semi-trailer 10. FIG. 1 shows row $R_2$ having installed therein the release system 30, i.e., the invention disclosed herein. As is obvious from FIG. 1, the carts 20 located in row $R_1$ have no means by which to stop, or hinder, their travel from the forward wall 12 to the loading end 11 of the semi-trailer 10. Thus, where the semi-trailer 10 is situated on an inclined area, the carts 20 will have a force driving them toward the loading end 11 caused by the force of gravity. Alternatively, where the semi-trailer 10 is located on a declined area, the carts 20 will be difficult to remove since gravity will be forcing them toward the forward wall 12 of the semi-trailer 10. As will be explained further infra, row $R_2$, with the release system 30 installed therein, overcomes the difficulties associated with the carts 20 located in row $R_1$; or otherwise helps to aid the removal of carts 20.

Turning now to the carts 20 of FIG. 1, broadly, carts 20 have front wheels 22, 23 and rear wheels 24, 25. As explained supra, the dimensions of the carts 20 and semi-trailer 10 in FIG. 1 are such that two sets of carts 20 may be accommodated by the semi-trailer 10. The carts 20 are shown loaded in a certain direction; however, the front wheels 22, 23 could alternatively be located closer to the forward wall 12 of the semi-trailer 10 than the rear wheels 24, 25 (i.e., the carts 20 could be arranged 180 degrees from what is shown within FIG. 1).

Although the embodiment described in detail herein utilizes material-handling carts adapted for loading onto a conventional semi-trailer truck, including additions or modifications according to the invention, it should be understood that the inventive principals are applicable to a wide range of applications apart from those depicted and described herein with specificity. Indeed, as will become evident through the descriptions below, one of skill in the art of materials transport will appreciate that the invention is equally applicable to any cargo-movement situation wherein, in particular, the need exists for a mechanism to aid with loading or unloading the carts 20. Accordingly, the invention is not limited to semi-trailer use, but is also applicable to other types of trucks and materials transport vehicles, shipping, and even water-going vessels, should these alternative operational environments be in need of such a system.

Figure 2:
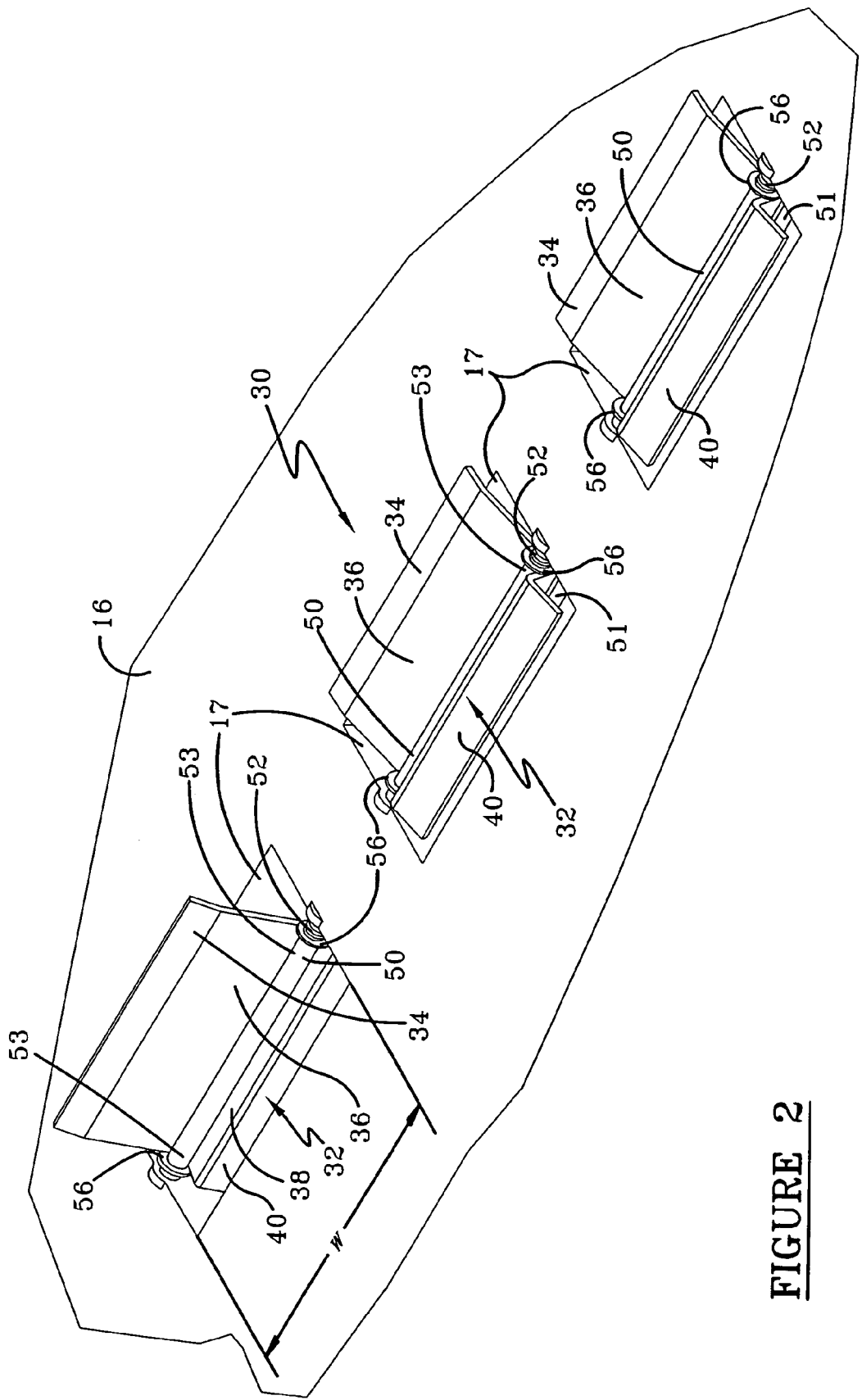
FIG. 2 is a perspective view showing the release system of the present invention.

With reference to FIG. 2, the release system 30 has at least one ramp 32 that is located within the floor 16 of the semi-trailer 10. As will be discussed infra the release system 30 can be incorporated into a liftgate that is used in association with a semi-trailer 10. The ramp 32 has as its chief objective to contact as least one wheel of the cart 20 in order to, at the very least, slow down the cart's travel. Thus, the ramp 32 can have a variety of configurations while still meeting its desired end function. FIG. 2 shows the ramp 32 having an inclined portion 34. The inclined portion 34 provides a transition from the floor 16 of the semi-trailer 10 onto and within a center section 36. The center section 36 is attached to and/or is one unit with inclined portion 34. The center section 36 of the ramp 32 forms a 90 degree angle with its adjacent upper section 38 (upper section 38 is more fully shown in FIG. 3 et seq., and FIG. 4, et seq.). The ramp 32 is finally described by a down-turn portion 40 that is adjacent to, and connects with, upper section 38. Together, sections/portions 34, 36, 38, 40 form the ramp 32. The ramp 32 rotates about a central axis 50. The central axis 50 extends the full width W of the ramp 32; however its function is to allow the ramp 32 to rotate and any means which achieves this rotation is within the scope of this invention. At one end of the central axis 50 is a spring 52. The spring 52 has a spring force $K_1$, used to add friction to the pivoting motion of the ramp 32 to hold it in either the raised or lowered position (unloaded position). The unloaded position will be described more fully infra. The central axis 50, preferably, is a rod whose respective ends 53 are assembled within, or to, the floor 16 of the semi-trailer 10. End washers 56 are located at each end 53 of the central axis 50. The ramps 32 and associated central axis 50 are typically made of a steel or otherwise rigid material. The central axis 50 is attached within an opening 17 of the floor 16. Any means utilized to attach the central axis 50 yet accomplish its desired function is within the scope of this invention. The release system 30 is located within openings 17 of the floor 16 of the semi-trailer 10. The configurations shown are rectangular; however, other configurations of the ramp 32 and, hence, the release system 30 are within the scope of this invention. As just one example, the central axis 50 could be a part of the ramp 32. Such configuration would mean that there are extensions on each end of the central axis that would allow for the rotation of the ramp 32 within the opening 17.

With continuing reference to FIG. 2, FIG. 2 shows a plurality of release system 30. Each release system 30 is meant to come in contact with only one wheel of the cart 20; however, it is within the scope of this invention that the width W of the ramp 32 could be such that both front wheels 22, 23 or rear wheels 24, 25 can be in contact simultaneously with one ramp 32. Alternatively, the release system 30 can be staggered throughout the length L (shown in FIG. 1) of the semi-trailer 10. Additionally, if desired, release system 30 can have a plurality of release systems such that each wheel of the cart 20 comes in contact with a separate release system 30. Also, release system 30 can be alternatively arranged 180 degrees with respect to one another such that the loading of the carts are hindered. All of the orientations of the release system 30 are dependent upon the desired end result.

Figure 3:
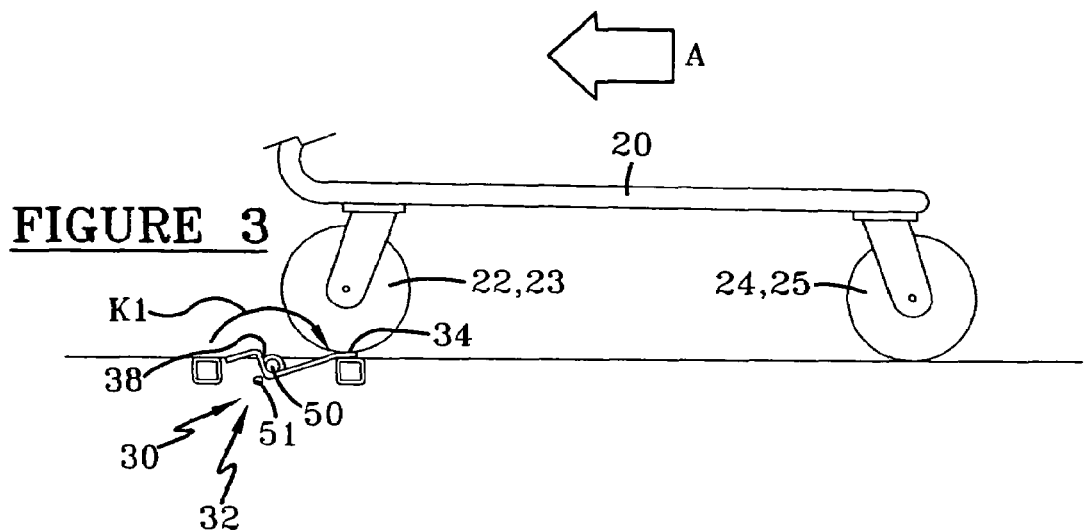
FIGS. 3, 3A, 3B, 3C are two-dimensional drawings showing the position of the release system and, more particularly, the engaging mechanism and engaging member when the carts are removed from the semi-trailer along removal path A.

With reference to FIG. 3, prior to explanation of the operation of the release system 30, stop 51 is more appropriately shown here. Stop 51 is located below and somewhat adjacent to central axis 50. It is preferably a rod similar to central axis 50; however, its function is to provide a stop to ramp 32 and anything that accomplishes that is within the scope of this invention.

Figure 3A:
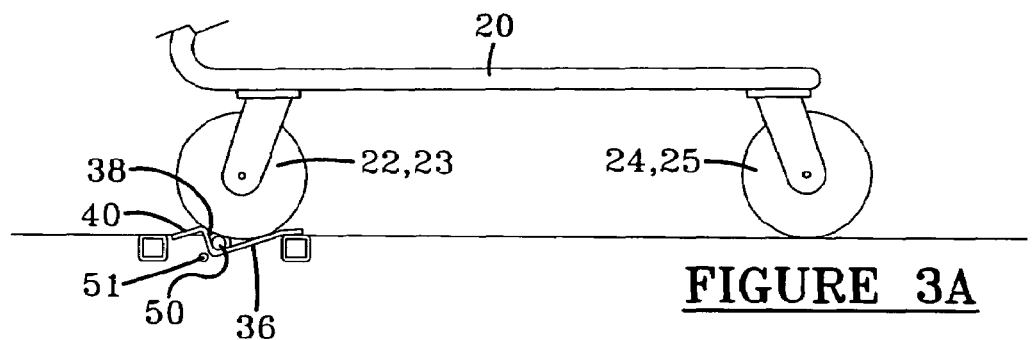
Figure 3B:
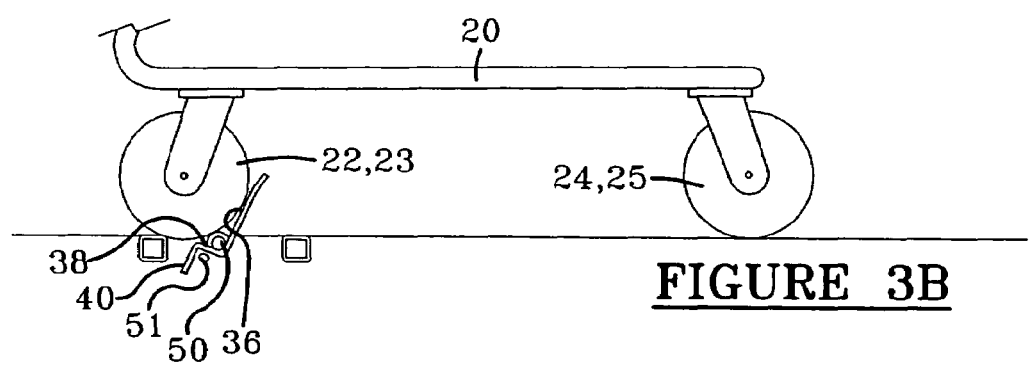
Figure 3C:
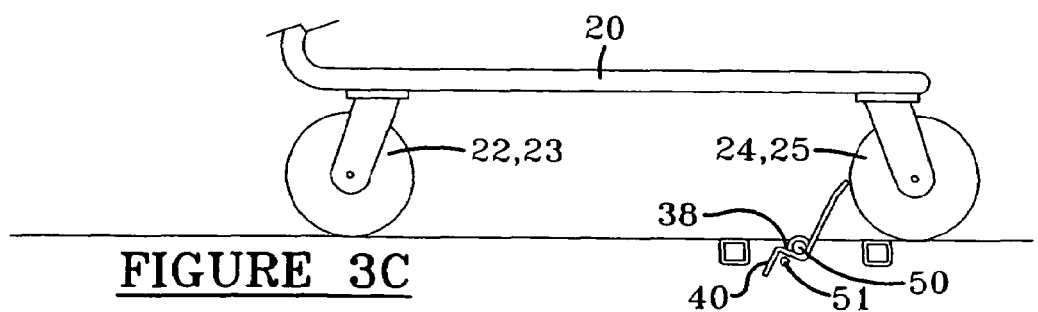

FIGS. 3, 3A, 3B, 3C show the same cart 20 being removed from a semi-trailer 10 in the direction of arrow A in sequential stages. The sequence of movement of cart 20 is depicted as it travels over and beyond the release system 30. FIGS. 3, 3A, 3B, 3C show the sequence as four (4) sequences to show how the release system and carts operate in conjunction with one another. With reference to FIG. 3, the cart 20 has at least one front wheel 22, 23 engage the release system 30 and, more specifically, the inclined portion 34 of the ramp 32. FIG. 3 is shown initially in an unloaded position whereby the center section 36 and the upper section 38 are in contact with the central axis 50 and the inclined portion 34 rests upon floor 16 of the semi-trailer 10. As at least one front wheel 22, 23 travels upon and over inclined portion 34 of the ramp 32, it thereafter engages with center section 36 as shown in FIG. 3A. At this point, inclined portion 34 via the force of the cart 20 rests upon the floor 16 of the semi-trailer 10. FIG. 3B next shows the movement of the cart 20 as it engages the upper section 38. As at least one front wheel 22, 23 of the cart 20 engages the upper section 38 of the ramp 32, the ramp 32 comes in contact with stop 51. In the traveling state of FIG. 3B the ramp 32 rotates about axis 50. The upper section 38 rests upon stop 51 to cease the rotation of the ramp 32. FIG. 3C shows the cart 20 having its at least one rear wheel 24, 25 engaged by the inclined portion 34 of the ramp 32 of the release system 30. The release system 30 is now in a loaded or stopped position which restricts the cart 20 from further movement. In order to move beyond the release system 30, the cart 20 would have to either be lifted over the ramp 32 or otherwise be moved in the direction opposite arrow A to a position that would allow the release system 30 to be in its unloaded position as shown within FIG. 3. In order to accomplish allowing at least one rear wheel 24, 25 to travel past the release system 30, a user must push the cart in a direction opposite to arrow A (arrow B, see FIG. 4) and then manipulate the ramp 32 to an unloaded position as in FIG. 3. Alternatively, such a release system could be electronically, pneumatically, mechanically, or otherwise controlled via some system that allows remote operation of the release system 30. For example, if there was an electrical-type system installed, as a cart 20 was being removed from the semi-trailer 10 in a direction of arrow A of FIG. 3, the remote system would engage either the front wheel 22, 23 or a rear wheel 24, 25 as in FIG. 3C in order to cease movement of the cart 20. Once a user is ready to remove a cart 20 from the vehicle, the remote system would allow the ramp 32 to be in an unloaded position, i.e., FIG. 3. This action could be continued throughout the releasing or loading of the carts in the semi-trailer 10.

Figure 4:
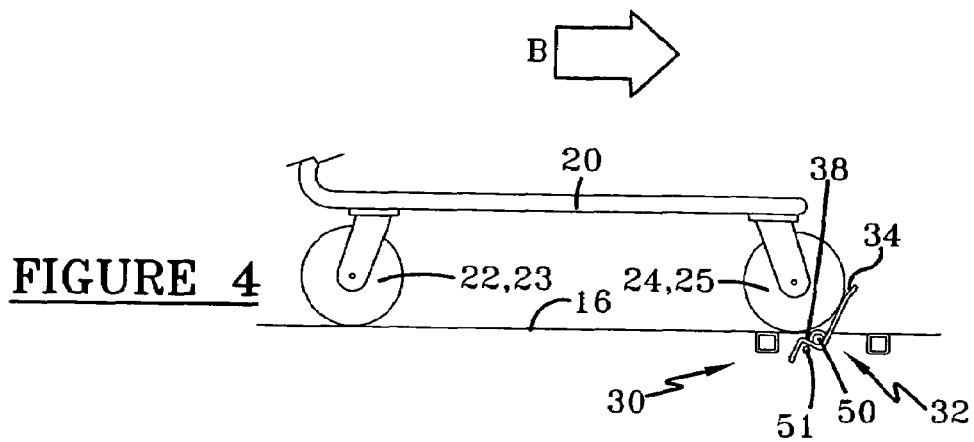
FIGS. 4, 4A, 4B, 4C, 4D are two-dimensional drawings showing the position of the release system and, more particularly, the engaging mechanism and engaging member as the carts are returned to the semi-trailer along return path B.
Figure 4A:
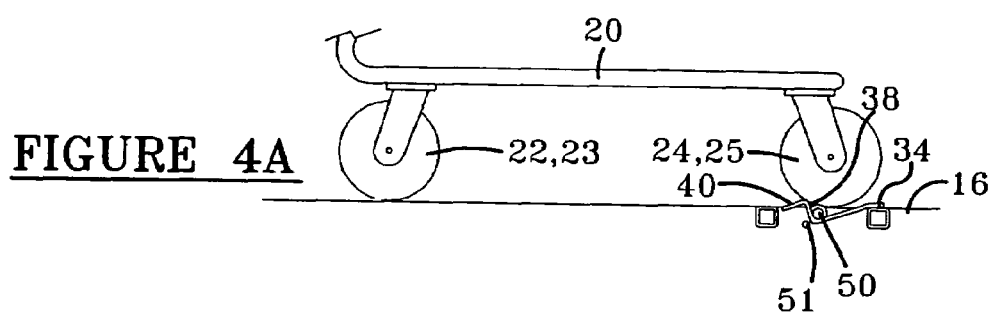
Figure 4B:
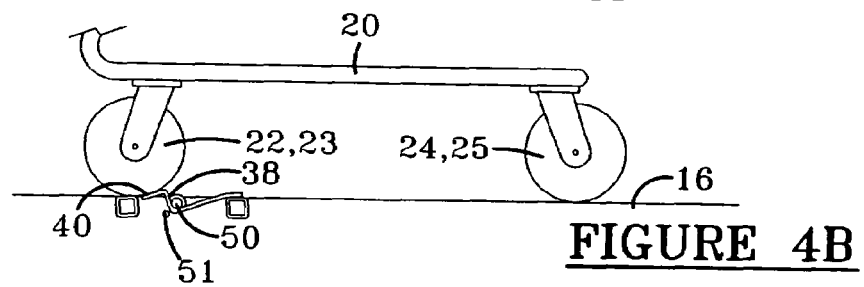
Figure 4C:
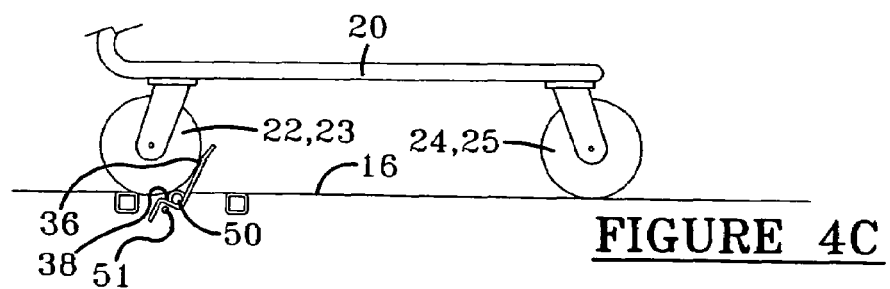
Figure 4D:
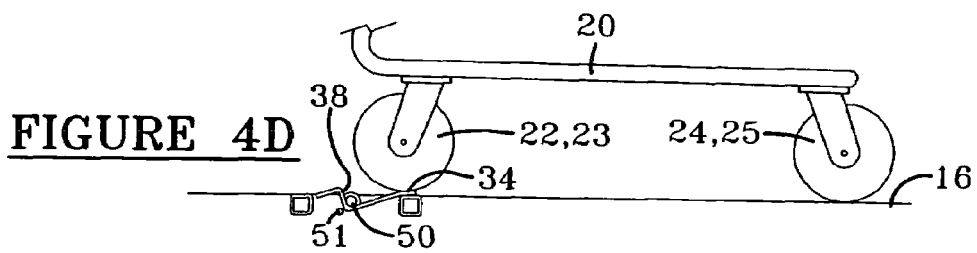

With reference to FIG. 4, FIG. 4 shows the carts 20 returning to the semi-trailer 10 in the direction of arrow B. Basically, just the opposite effect as that of the removal of the carts from the semi-trailer of FIG. 3 occurs. FIG. 4 shows a sequence of five (5) positions as the cart 20 is returning to the semi-trailer 10. These five (5) positions are depicted by FIGS. 4, 4A, 4B, and 4C. FIG. 4 shows the cart 20 initially returning to the semi-trailer 10 and engaging the ramp 32, which in the position of returning the carts 20 to the semi-trailer 10 is always in an open position. As the cart 20 returns to the semi-trailer 10 it is on the opposite side of the stopped position of FIG. 3C. As it travels to the second position as shown in FIG. 4A, the release system 30 is in its unloaded position of FIG. 3. With respect to FIG. 4B, the second wheel (whether it be the front or rear wheel is immaterial) engages the downturn portion 40 of the ramp 32. As it travels upon the downturn portion 40, it comes in contact with upper section 38 and rotates ramp 32 into the stopped position of FIG. 3C; however, the release system 30 does not cease the movement of cart 20 when being returned to the semi-trailer 10. FIG. 4D is similar to that of FIG. 4A as the second wheel travels over the inclined portion 34 of the ramp 32 and the release system 30. Therefore, as the carts 20 are returned to the semi-trailer 10 in the direction of arrow B, there is nothing that impedes the progress, i.e., stops, the carts 20 from their return to the semi-trailer 10. A release system 30 only stops the carts 20 from being released out of the semi-trailer 10. However, as stated supra, if one desires to have the release system 30 act to impede the progress of carts 20 both as they are released and loaded into the semi-trailer 10, that is within the scope of this invention.

Figure 5:
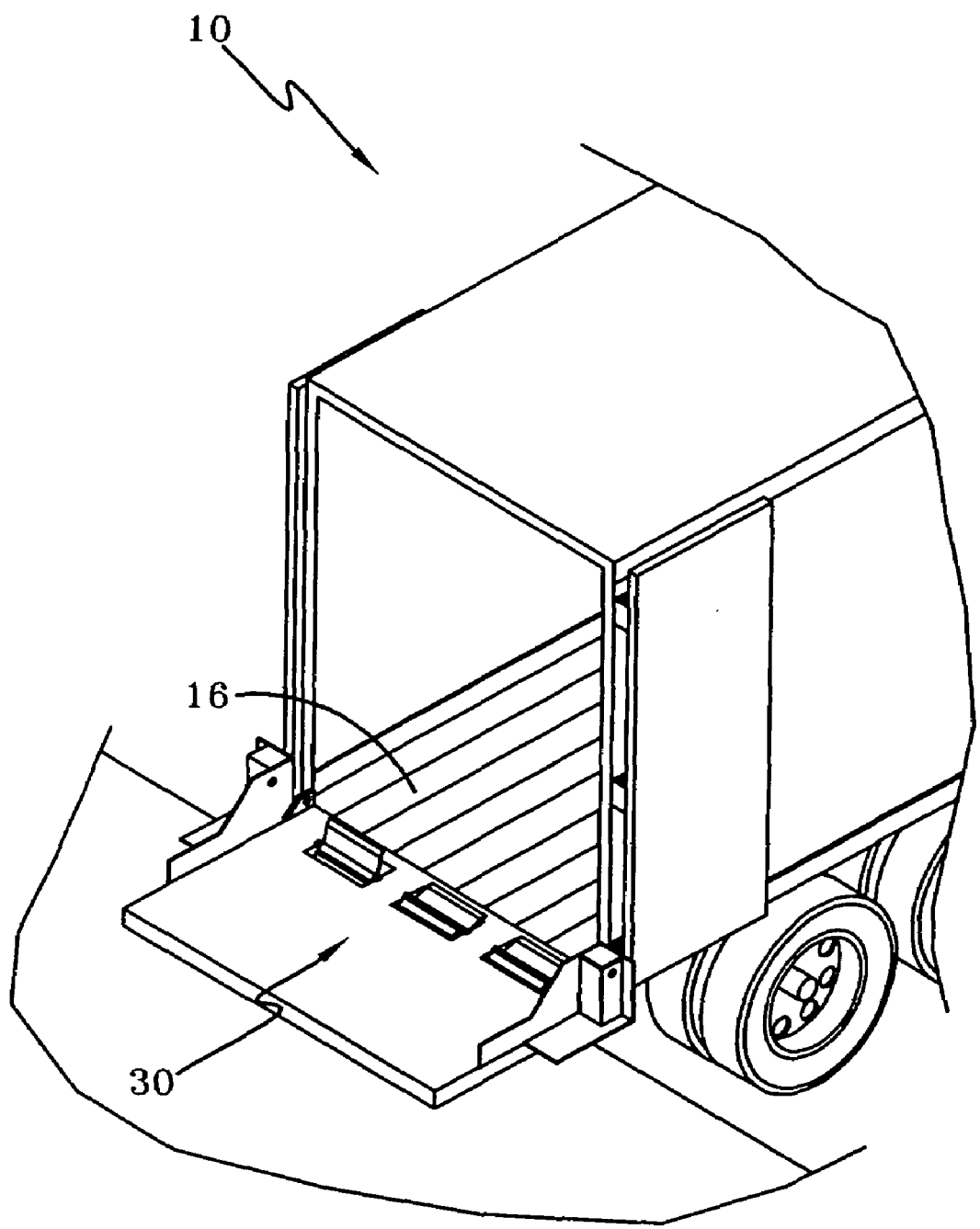
FIG. 5 is a perspective view of a trailer showing the invention installed within a lift-gate mechanism wherein the liftgate is in an open position.

FIG. 5 shows the release system 30 in association with a liftgate mechanism that is typically found on the rear of semi-trailer trucks. A liftgate mechanism is known in the art and a description of a typical liftgate system is disclosed in U.S. Pat. No. 6,109,675, which is incorporated herein by reference. As is shown in FIG. 5, a liftgate mechanism can incorporate a plurality of release systems 30 in its loading ramp; however, a single release system 30 is also within the scope of this invention. All of the above-mentioned explanation with respect to the release system in association with a liftgate can be accomplished in like manners. For example, the liftgate has an opening that allows the release system 30 to be incorporated within. The liftgate has a loading ramp with at least one opening within its loading ramp. The at least one ramp is positioned within the loading ramp of the liftgate. The loading ramp has the ability to impede the travel of the cart along the loading ramp of the liftgate just as the release system 30 is disclosed above. The operation of the release system 30 is identical to that as described within the trailer.

Having thus described the invention, it is now claimed.

I claim:

1. An apparatus to aid the removal of carts from a trailer, the carts having two front wheels and two rear wheels, said apparatus comprising:

a liftgate having a loading ramp with at least one opening within said loading ramp;

at least one rotatable ramp fixedly attached within the opening of said loading ramp and attached to said loading ramp of said liftgate, said at least one rotatable ramp having a central axis about which it rotates, said at least one rotatable ramp having a first, second, third and fourth portion, said second, third portions able to be respectively selectively engaged by one wheel of said cart, said second, third portions forming a 90 degree or less angle with respect to one another, said first portion angled downwardly with respect to said loading ramp forming an upward ramp from said loading ramp to said first portion, said first portion being continuous with said second portion, said second portion extending downwardly into said opening of said loading ramp, said second portion being contiguous with said third portion, said at least one rotatable ramp rotating about where said second and third portions meet.

2. The apparatus of claim 1 wherein the at least one rotatable ramp further comprises:

a spring for use in selectively maintaining the at least one rotatable ramp in a first position and a second position, wherein the spring is located at a first end of the central axis.

3. The apparatus of claim 1 wherein the at least one rotatable ramp further comprises:

a stop device for limiting the rotation of the at least one rotatable ramp.

4. The apparatus of claim 3 wherein the stop device is located below the central axis.

5. The apparatus of claim 1 wherein the central axis further comprises:

a first extension located at a first end of the central axis and a second extension located at a second end of the central axis wherein the central axis is an integral component of the at least one rotatable ramp and the first extension and the second extension allow for the rotation of the at least one rotatable ramp within the opening of the loading ramp.

6. The apparatus of claim 1 wherein the second portion and the third portion are able to selectively engage two wheels of the cart.

7. A method for removing carts from a trailer having a liftgate with a loading ramp with at least one opening within said loading ramp installed therein, said liftgate further having at least one rotatable ramp located therein, said at least one rotatable ramp having a central axis about which it rotates, said at least one rotatable ramp having a first, second, third and fourth portion, said second, third portions able to be respectively selectively engaged by one wheel of said cart, said second, third portions forming a 90 degree or less angle with respect to one another, said first portion angled downwardly with respect to said loading ramp forming an upward ramp from said loading ramp to said first portion, said first portion being continuous with said second portion, said second portion extending downwardly into said opening of said loading ramp, said second portion being contiguous with said third portion, said at least one rotatable ramp rotating about where said second and third portions meet, the carts having two front wheels and two rear wheels, wherein said at least one rotatable ramp of said liftgate is in a first position that allows said cart to travel across said at least one rotatable ramp without impeding said cart's travel, said method comprising:

(a) moving the cart from a first position inside the trailer bed to a second position, said second position contacting said loading ramp of said liftgate wherein at least one wheel of said cart engages said at least one rotatable ramp located within said loading ramp of said opening of said liftgate;

(b) rotating said at least one rotatable ramp of said liftgate to a second position;

(c) moving said cart to a third position whereby at least one rear wheel contacts said at least one rotatable ramp that is in a first position whereby said at least one rotatable ramp stops the travel of said cart at this third position;

(d) pulling said cart away from said at least one rotatable ramp in a direction opposite to said movement in (c);

(e) rotating said at least one rotatable ramp to said first position;

(f) moving said cart to a fourth position wherein the entire cart is beyond said at least one rotatable ramp.

8. A release apparatus for use with wheeled carts of the type configured for materials handling and having at least one front wheel and at least one rear wheel and a vehicle having a cart-carrying area with a fore section, an aft section, a front wall, and a floor for cart loading and unloading, the release apparatus comprising:

at least one rotatable ramp positioned with the floor of the cart-carrying vehicle, wherein the at least one rotatable ramp has a central axis about which the at least one rotatable ramp rotates, wherein the at least one rotatable ramp has a first portion, a second portion, a third portion, and a fourth portion, wherein the second portion and the third portion are able to be respectively selectively engaged by one wheel of the wheeled cart, wherein the second portion and the third portion form a 90 degree or less angle with respect to one another, wherein the first portion is angled downwardly with respect to the floor of the cart-carrying vehicle forming an upward ramp from the floor of the cart-carrying vehicle to the first portion, wherein the first portion is contiguous with the second portion and the second portion extends downwardly into the floor of the cart-carrying vehicle, wherein the second portion is contiguous with the third portion, and, wherein the central axis is located about where the second portion and the third portion meet.

9. The release apparatus of claim 8 further comprising:

a spring for use in selectively maintaining the at least one rotatable ramp in a first position and a second position, wherein the spring is located at a first end of the central axis.

10. The release apparatus of claim 8 further comprising:

a stop device for limiting the rotation of the at least one rotatable ramp.

11. The release apparatus of claim 10 wherein the stop device is located below the central axis.

12. The release apparatus of claim 8 wherein the second portion and the third portion are able to selectively engage two wheels of the cart.

13. A method comprising the steps of:

(a) providing a vehicle having a cart-carrying area, wherein the cart-carrying area comprises a fore section, an aft section, a front wall, and a floor, wherein the floor comprises at least one opening having at least one rotatable ramp located therein, wherein the at least one rotatable ramp comprises a central axis about which the at least one rotatable ramp can rotate, a first portion, a second portion, a third portion, and a fourth portion, wherein the second and the third portions are able to be respectively selectively engaged by a first wheel of a cart and, the second portion and the third portion form a 90 degree or less angle with respect to one another, wherein the first portion is angled downwardly with respect to the floor thereby forming an upward ramp from the floor to the first portion and the first portion is continuous with the second portion, wherein the second portion extends downwardly into the opening of the floor and the second portion is contiguous with the third portion, wherein the at least one rotatable ramp rotates about where the second portion and the third portion meet, wherein the at least one rotatable ramp is in a first ramp position that allows the cart to travel across the at least one rotatable ramp without impeding the cart's travel;

(b) moving the can in a first direction from a first cart position outside the cart-carrying area of the vehicle to a second cart position, wherein a first wheel of the cart engages the at least one rotatable ramp;

(c) rotating the at least one rotatable ramp to a second ramp position; and, (d) moving the cart to a third cart position wherein a second wheel of the cart contacts the at least one rotatable ramp, wherein the at least one rotatable ramp substantially prevents the movement of the cart in a second direction.

14. The method of claim 13 further comprising the steps of:
moving the cart in a third direction, wherein the third direction is opposite to the second direction;
rotating the at least one rotatable ramp to the first position; and,
moving the cart in the first direction to a fourth position wherein the entire cart is beyond the at least one rotatable ramp.

15. The method of claim 13, wherein the first direction is opposite to the second direction.

16. The method of claim 13, wherein the first direction and the second direction are substantially the same.

* * * * *